US012719046B2

(12) United States Patent
Jo et al.

(10) Patent No.: US 12,719,046 B2
(45) Date of Patent: Aug. 25, 2026

(54) POSITIVE ELECTRODE INCLUDING POSITIVE ELECTRODE ADDITIVE FOR LITHIUM SECONDARY BATTERY

(71) Applicants: LG Energy Solution, Ltd., Seoul (KR); Sookmyung Women's University Industry-Academic Cooperation Foundation, Seoul (KR)

(72) Inventors: Chi Ho Jo, Daejeon (KR); Wang Mo Jung, Daejeon (KR); Won Hee Ryu, Seoul (KR); You Jin Kim, Seoul (KR); Su Ji Kim, Seoul (KR)

(73) Assignees: LG Energy Solution, Ltd., Seoul (KR); Sookmyung Women's University Industry-Academic Cooperation Foundation, Seoul (KR)

( * ) Notice: Subject to any disclaimer, the term of this patent is extended or adjusted under 35 U.S.C. 154(b) by 481 days.

(21) Appl. No.: 18/285,784

(22) PCT Filed: Aug. 12, 2022

(86) PCT No.: PCT/KR2022/012105
§ 371 (c)(1),
(2) Date: Oct. 5, 2023

(87) PCT Pub. No.: WO2023/018289
PCT Pub. Date: Feb. 16, 2023

(65) Prior Publication Data

US 2024/0194857 A1 Jun. 13, 2024

(30) Foreign Application Priority Data

Aug. 12, 2021 (KR) ........................ 10-2021-0106870

(51) Int. Cl.
*H01M 4/36* (2006.01)
*C01G 53/50* (2025.01)
(Continued)

(52) U.S. Cl.
CPC ............ *H01M 4/364* (2013.01); *C01G 53/50* (2013.01); *H01M 4/131* (2013.01);
(Continued)

(58) Field of Classification Search
CPC .... C01G 53/50; H01M 10/052; H01M 4/364; H01M 4/131; H01M 4/1391; H01M 4/48; H01M 4/505; H01M 4/525
See application file for complete search history.

(56) References Cited

U.S. PATENT DOCUMENTS

2008/0118833 A1 5/2008 Ueda et al.
2011/0033750 A1 2/2011 Hosokawa et al.
(Continued)

FOREIGN PATENT DOCUMENTS

CN 101061600 A 10/2007
CN 108199035 A 6/2018
(Continued)

OTHER PUBLICATIONS

Extended European Search Report including Written Opinion for Application No. 22856282.3 dated May 13, 2025. 9 pages.
(Continued)

*Primary Examiner* — Sarah A. Slifka
(74) *Attorney, Agent, or Firm* — Lerner David LLP

(57) ABSTRACT

A positive electrode with excellent life characteristics and high capacity is provided by using a positive electrode additive of $ZrO_{2-x}$ (0<x<2) to complement structural stability of a high-nickel positive electrode active material. A method of preparing the same, and a lithium secondary battery including the positive electrode are also provided.

13 Claims, 3 Drawing Sheets

(51) Int. Cl.

| | |
|---|---|
| ***H01M 4/02*** | (2006.01) |
| ***H01M 4/131*** | (2010.01) |
| ***H01M 4/1391*** | (2010.01) |
| ***H01M 4/48*** | (2010.01) |
| ***H01M 4/505*** | (2010.01) |
| ***H01M 4/525*** | (2010.01) |
| ***H01M 10/052*** | (2010.01) |

(52) U.S. Cl.

CPC ........... *H01M 4/1391* (2013.01); *H01M 4/48* (2013.01); *H01M 4/505* (2013.01); *H01M 4/525* (2013.01); *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 2011/0281165 | A1 | 11/2011 | Ueda et al. |
| 2013/0224591 | A1 | 8/2013 | Kishimi et al. |
| 2018/0053940 | A1 | 2/2018 | Jo et al. |
| 2021/0367242 | A1 | 11/2021 | Soeda et al. |

FOREIGN PATENT DOCUMENTS

| | | | |
|---|---|---|---|
| CN | 112701290 | A | 4/2021 |
| CN | 111769273 | B | 4/2022 |
| JP | S52142242 | A | 11/1977 |
| JP | 2014056683 | A | 3/2014 |
| JP | 2014167876 | A | 9/2014 |
| JP | 6739086 | B1 | 8/2020 |
| KR | 20040067030 | A | 7/2004 |
| KR | 20050038899 | A | 4/2005 |
| KR | 20130107132 | A | 10/2013 |
| KR | 20130112567 | A | 10/2013 |
| KR | 101523082 | B1 | 5/2015 |
| KR | 20170003438 | A | 1/2017 |
| KR | 20170108310 | A | 9/2017 |
| KR | 20180093709 | A | 8/2018 |
| KR | 20190024680 | A | 3/2019 |
| KR | 20200010802 | A | 1/2020 |
| KR | 102078379 | B1 | 2/2020 |
| WO | 2006054604 | A1 | 5/2006 |
| WO | 2006123572 | A1 | 11/2006 |
| WO | 2010100910 | A1 | 9/2010 |
| WO | 2013125021 | A1 | 8/2013 |

OTHER PUBLICATIONS

Liu Yongqiang et al: “Atomic-scale tuned 1,8 H01M4/02 interface of nickel-rich cathode for enhanced electrochemical performance in lithium-ion batteries”, Journal of Materials Science & Technology, Allerton Press, Amsterdam, NL, vol. 54, May 15, 2020 (May 15, 2020), pp. 77-86, XP086207286.

Lee, N. et al., “Highly Conductive Off-Stoichiometric Zirconium Oxide Nanofibers with Controllable Crystalline Structures and Bandgaps and Improved Electrochemical Activities”, ACS Applied Energy Materials, Apr. 2019, vol. 2, pp. 1-23.

International Search Report for Application No. PCT/KR2022/012105 mailed Nov. 18, 2022. 3 pages.

POSITIVE ELECTRODE INCLUDING POSITIVE ELECTRODE ADDITIVE FOR LITHIUM SECONDARY BATTERY

CROSS-REFERENCE TO RELATED APPLICATIONS

This application is a national phase entry under 35 U.S.C. § 371 of International Application No. PCT/KR2022/012105, filed on Aug. 12, 2022, which claims priority from Korean Patent Application No. 10-2021-0106870, filed on Aug. 12, 2021, the disclosures of which are incorporated by reference herein.

TECHNICAL FIELD

The present invention relates to a positive electrode additive which is included in a positive electrode including a high-nickel (high-Ni) lithium transition metal oxide.

BACKGROUND ART

With the recent technological development of electric vehicles, demand for high-capacity secondary batteries is increasing, and, accordingly, research on a high-nickel (high-Ni) positive electrode active material having excellent capacity characteristics is being actively conducted.

The high-nickel positive electrode active material is a positive electrode active material with a nickel content of 60 atm % or more, wherein high capacity may be achieved, but, since structural stability of the positive electrode active material is reduced as the nickel content is increased, there is a problem in that life characteristics and stability at high voltage are degraded.

For example, cracks are likely to occur in the high-nickel positive electrode active material because a change in a lattice constant, that is, a volume change in a unit lattice occurs in intercalation and deintercalation processes of lithium ions during charge and discharge. An electrolyte solution penetrates into the positive electrode active material through such cracks and structural degradation of the positive electrode active material and decomposition of the electrolyte solution are accelerated to degrade the life characteristics, and a problem, such as a decrease in output characteristics, occurs due to an increase in resistance which is caused by the formation of a film due to the decomposition of the electrolyte solution.

Thus, there is a need to develop a positive electrode active material which has excellent life characteristics while being able to achieve high capacity, and various positive electrode additives have been proposed in order to solve the structural instability of the high-nickel positive electrode active material.

DISCLOSURE

Technical Problem

An aspect of the present invention provides a positive electrode in which life characteristics are excellent while high capacity is achieved by using a positive electrode additive of $ZrO_{2-x}$ ($0<x<2$) to complement structural stability of a high-nickel positive electrode active material, a method of preparing the same, and a lithium secondary battery including the positive electrode.

Technical Solution

According to an aspect of the present invention, there is provided a positive electrode including a positive electrode active material layer which includes a positive electrode active material, a conductive agent, a binder, and a positive electrode additive, wherein the positive electrode additive is $ZrO_{2-x}$ ($0<x<2$).

According to another aspect of the present invention, there is provided a method of preparing a positive electrode which includes steps of: preparing $ZrO_{2-x}$ ($0<x<2$) by reducing a precursor containing zirconium (Zr); preparing a positive electrode slurry by mixing the $ZrO_{2-x}$, as a positive electrode additive, with a positive electrode active material, a conductive agent, and a binder; and preparing a positive electrode active material layer by using the positive electrode slurry.

According to another aspect of the present invention, there is provided a secondary battery including the positive electrode.

Advantageous Effects

Since a positive electrode according to the present invention has large initial capacity by using a high-nickel positive electrode active material and structural stability of the high-nickel positive electrode active material is also improved due to an additive of $ZrO_{2-x}$ ($0<x<2$), a secondary battery including the positive electrode according to the present invention has excellent cycle characteristics.

Also, since the positive electrode according to the present invention has improved structural stability, high rate capability is excellent when it is used in a secondary battery and the positive electrode additive of $ZrO_{2-x}$ ($0<x<2$) collects gas generated during charge and discharge to have an effect of reducing gas generation.

Thus, the positive electrode according to the present invention may be suitably used in a lithium secondary battery.

MODE FOR CARRYING OUT THE INVENTION

Figure 1:
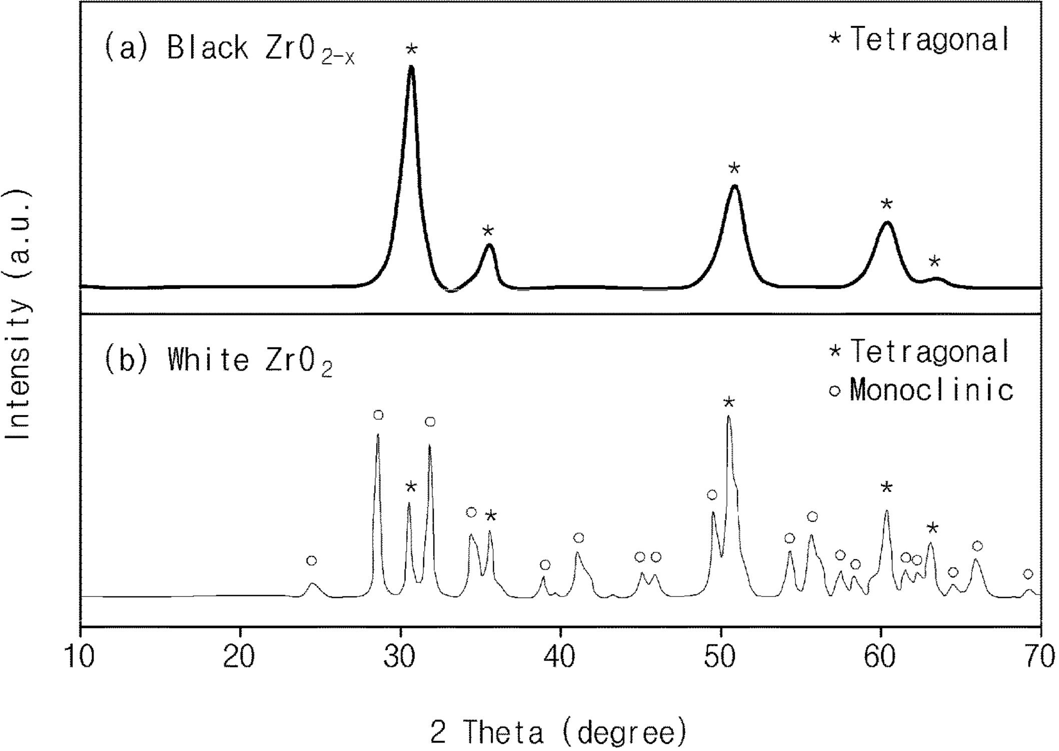
FIG. 1 is a result of observing X-ray diffraction (XRD) patterns for (a) $ZrO_{2-x}$ ($0<x<2$) particles of Preparation Example 1 and (b) $ZrO_2$ particles of Preparation Example 2 using an X-ray diffraction analyzer.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Hereinafter, the present invention will be described in more detail.

In the present application, the expression "primary particle" denotes a smallest particle unit which is distinguished as one body when a cross section of a positive electrode active material is observed through a scanning electron microscope (SEM), wherein it may be composed of a single grain, or may also be composed of a plurality of grains. An average particle diameter of the primary particle may be measured by measuring a size of each particle distinguished from a cross-sectional SEM image of the positive electrode active material particles and then calculating an arithmetic average value thereof.

In the present application, the expression "secondary particle" denotes a secondary structure formed by aggregation of a plurality of primary particles. An average particle diameter of the secondary particle may be measured using a particle size analyzer, and, in the present application, Microtrac s3500 was used as the particle size analyzer.

The expression "particle diameter Dn" in the present application denotes a particle diameter at n % of cumulative distribution of volume according to the particle diameter. That is, D50 is a particle diameter at 50% of the cumulative distribution of volume according to the particle diameter, D90 is a particle diameter at 90% of the cumulative distribution of volume according to the particle diameter, and D10 is a particle diameter at 10% of the cumulative distribution of volume according to the particle diameter. The Dn may be measured by using a laser diffraction method. Specifically, after dispersing measurement target powder in a dispersion medium, the dispersion medium is introduced into a commercial laser diffraction particle size measurement instrument (e.g., Microtrac S3500) and a particle size distribution is calculated by measuring a difference in diffraction patterns due to a particle size when particles pass through a laser beam. The D10, D50, and D90 may be measured by calculating particle diameters at 10%, 50%, and 90% of the cumulative distribution of volume according to the particle diameter using the measurement instrument.

X-ray diffraction analysis in the present application may be performed using a Bruker's D8 Advance (TRIO/TWIN) instrument under the following conditions to obtain X-ray diffraction (XRD) data, and the XRD data may then be processed using a Bruker's DIFFRAC.EVA program. In this case, a full width at half-maximum was set to be measured using the Caglioti equation.

<X-Ray Diffraction Analysis Conditions>

X-ray source: Cu-target, 40 kV, 40 mA output, wavelength=1.54 Å

Detector: LYNXEYE XE-T

Sample preparation: 0.5 g of a sample was filled in a holder with a diameter of 2 cm and loaded on a rotation stage Measurement time: 60 minutes Measurement range: 2θ=10°~70°

Positive Electrode Additive

A positive electrode according to the present invention may include a positive electrode additive of $ZrO_{2-x}$ ($0<x<2$).

The positive electrode additive according to an embodiment of the present invention has a spherical shape, and may have an average particle diameter ($D_{50}$) of 0.2 μm to 50 μm. The average particle diameter ($D_{50}$) may be preferably in a range of 0.2 μm to 5 μm, and may be more preferably in a range of 0.2 μm to 1 μm. In a case in which the average particle diameter of the positive electrode additive satisfies the above range, since the positive electrode additive is evenly distributed on a surface of a positive electrode active material when it is mixed with the positive electrode active material, it may effectively collect oxygen generated during charge and discharge in the positive electrode active material, and thus, life characteristics of the positive electrode may be improved.

The positive electrode additive $ZrO_{2-x}$ ($0<x<2$) of the present invention may satisfy Equation 1 below.

$$5<P1/P2<8 \quad \text{[Equation 1]}$$

In Equation 1, P1 is an intensity of a peak in a 2θ range of 29° or more to 31° or less on XRD, and P2 is an intensity of a peak in a 2θ range of 35° or more to 37° or less on XRD. The positive electrode additive of the present invention may preferably have a value of P1/P2 of greater than 5 and less than 7, more preferably, greater than 5 and less than 6. In a case in which the value of P1/P2 of the positive electrode additive satisfies the above range, it may be confirmed that the positive electrode additive has a tetragonal crystal structure, and, in a case in which the positive electrode additive has a tetragonal crystal structure, since it may reduce band gap energy as an oxygen-deficient structure is formed, conductivity may be increased.

Positive electrode additive $ZrO_{2-x}$ ($0<x<2$) particles according to the present invention may have a tetragonal crystal structure. A monoclinic crystal structure and a tetragonal crystal structure are mixed in $ZrO_2$ before a reduction treatment, but the positive electrode additive $ZrO_{2-x}$ ($0<x<2$) particles according to the present invention may have a tetragonal crystal structure. In the case that the positive electrode additive has a tetragonal crystal structure, since it may reduce the band gap energy as the oxygen-deficient structure is formed, the conductivity may be increased.

The positive electrode additive according to the present invention may have a band gap energy of 3.0 eV or less, preferably 2.0 eV to 3.0 eV, and more preferably 2.5 eV to 3.0 eV. Since the positive electrode additive according to the present invention has high electronic and ionic conductivity due to the reduction of the band gap energy, a lithium secondary battery using the positive electrode additive according to the present invention is advantageous in that capacity is improved and fast charge and discharge is possible.

In the present invention, the positive electrode additive may be included in an amount of 1 wt % to 5 wt %, preferably 2 wt % to 4 wt %, and more preferably 2.5 wt % to 3.5 wt % based on a total weight of a positive electrode active material layer. In a case in which the amount of the positive electrode additive satisfies the above range, the battery capacity may be maintained within an appropriate range while the positive electrode additive and the positive electrode active material are uniformly mixed.

Positive Electrode

The positive electrode according to the present invention includes the above-described positive electrode additive of the present invention. Specifically, the positive electrode includes a positive electrode collector and a positive electrode active material layer formed on the positive electrode collector, wherein the positive electrode active material layer includes the positive electrode additive according to the present invention. Since the positive electrode additive has been described above, detailed descriptions thereof will be omitted, and the remaining configurations will be only described in detail below.

The positive electrode collector may include a metal having high conductivity, and is not particularly limited as long as it has no reactivity in a voltage range of the battery and the positive electrode active material layer is easily adhered thereto. As the positive electrode collector, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a positive electrode active material as well as optionally a conductive agent and a binder, if necessary, in addition to the above-described positive electrode additive.

The positive electrode active material according to the present invention may include a lithium transition metal oxide having an amount of nickel among metallic elements excluding lithium of 80 atm % or more.

Specifically, the lithium transition metal oxide included in the positive electrode active material of the present invention may have a composition represented by Formula 1 below.

$$Li_aNi_{1-x-y}Co_xM^1_yM^2_zO_2 \quad \text{[Formula 1]}$$

In Formula 1, $M^1$ may be at least one selected from manganese (Mn) and aluminum (Al), and may be preferably Mn or a combination of Mn and Al.

In Formula 1, $M^2$ may be at least one element selected from the group consisting of zirconium (Zr), titanium (Ti), magnesium (Mg), tantalum (Ta), niobium (Nb), tungsten (W), molybdenum (Mo), and chromium (Cr).

a represents a molar ratio of lithium in the lithium transition metal oxide, wherein a may satisfy $1.0 \le a \le 1.3$, $1.0 \le a \le 1.2$, or $1.0 \le a \le 1.1$.

$1-x-y$ represents a molar ratio of nickel among metallic elements excluding lithium in the lithium transition metal oxide, wherein $1-x-y$ may satisfy $0.6 \le 1-x-y \le 1.0$, $0.70 \le 1-x-y \le 0.98$, or $0.80 \le 1-x-y \le 0.95$. In a case in which the amount of the nickel satisfies the above range, high capacity characteristics may be achieved.

x represents a molar ratio of cobalt among the metallic elements excluding lithium in the lithium transition metal oxide, wherein x may satisfy $0<x<0.4$, $0<x \le 0.2$, or $0.01 \le x \le 0.10$.

y represents a molar ratio of $M^1$ among the metallic elements excluding lithium in the lithium transition metal oxide, wherein y may satisfy $0<y<0.4$, $0<y \le 0.2$, or $0.01 \le y \le 0.10$.

z represents a molar ratio of $M^2$ among the metallic elements excluding lithium in the lithium transition metal oxide, wherein z may satisfy $0 \le z \le 0.1$ or $0 \le z \le 0.05$.

The lithium transition metal oxide included in the positive electrode active material of the present invention may be in the form of a secondary particle in which a plurality of primary particles are aggregated, or may be in the form of a single particle.

The lithium transition metal oxide included in the positive electrode active material of the present invention may have an average particle diameter of the primary particle of 0.1 μm to 0.5 μm, for example, 0.1 μm to 0.3 μm. In a case in which the average particle diameter of the primary particle satisfies the above range, sufficient capacity of the secondary battery may be secured.

The lithium transition metal oxide included in the positive electrode active material of the present invention may have a D50 of the secondary particle of 8 μm to 15 μm, for example, 9 μm to 12 μm. In a case in which the D50 of the secondary particle is less than the above range, there is a problem in that a gas reaction due to a side reaction with an electrolyte solution in the prepared secondary battery is excessively increased, and, in a case in which the D50 of the secondary particle is greater than the above range, there is a problem in that the electrode collector is torn when the electrode is coated with the positive electrode active material.

The positive electrode according to the present invention may include the positive electrode active material in an amount of 80 wt % to 99 wt %, for example, 85 wt % to 98.5 wt % based on the total weight of the positive electrode active material layer, and, when the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive tubes such as carbon nanotubes; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be included in an amount of 0.1 wt % to 15 wt % based on the total weight of the positive electrode active material layer.

The binder improves the adhesion between positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, polymethylmethacrylate, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, poly acrylic acid, and a polymer having hydrogen thereof substituted with lithium (Li), sodium (Na), or calcium (Ca), or various copolymers thereof, and any one thereof or a mixture of two or more thereof may be used. The binder may be included in an amount of 0.1 wt % to 15 wt % based on the total weight of the positive electrode active material layer.

Method of Preparing Positive Electrode

A method of preparing a positive electrode according to the present invention may include the steps of: preparing $ZrO_{2-x}$ ($0<x<2$) by reducing a precursor containing Zr; preparing a positive electrode slurry by mixing the $ZrO_{2-x}$, as a positive electrode additive, with a positive electrode active material, a conductive agent, and a binder; and preparing a positive electrode active material layer by using the positive electrode slurry.

First, $ZrO_{2-x}$ ($0<x<2$) may be prepared by reducing a precursor containing Zr.

Specifically, the reduction may be performed by heat-treating a precursor solution containing Zr in a reducing atmosphere.

The precursor solution may be prepared by mixing a precursor containing Zr with a solvent, and, in this case, as the precursor containing Zr, acetate, sulfate, or nitrate of Zr may be used, and water, for example, deionized water, may be used as the solvent.

The reducing atmosphere is formed by injecting a reducing gas, wherein, for example, it may be formed by mixing argon and hydrogen gases.

The heat treatment may be performed in an atmosphere containing 1 vol % to 10 vol %, preferably 1 vol % to 8 vol %, and more preferably 3 vol % to 8 vol % of hydrogen ($H_2$) in argon (Ar).

The heat treatment may be performed at a temperature of 500° C. to 700° C., preferably 500° C. to 650° C., and more preferably 550° C. to 600° C. In a case in which the heat treatment temperature is less than 500° C., there is a problem in that the positive electrode additive does not grow to a sufficient particle size, and, in a case in which the heat treatment temperature is greater than 700° C., there may be a problem in that the particle size of the positive electrode additive is excessively grown or a phase change occurs.

The heat treatment time may be in a range of 4 hours to 6 hours, preferably, 4 hours to 5 hours. In a case in which the heat treatment time is less than 4 hours, there is a problem in that the positive electrode additive particles do not grow to a sufficient size, and, in a case in which the heat treatment time is greater than 6 hours, there may be a problem in that the positive electrode additive particles grow excessively or a phase change occurs.

If the heat treatment is performed in the reducing atmosphere above, hydrogenation proceeds on surfaces of $ZrO_2$ nanoparticles formed in the precursor material, and, thereafter, since oxygen vacancies are formed by a continuous $H_2O$ desorption reaction and Zr metal cations are simultaneously reduced by receiving electrons, $ZrO_{2-x}$ ($0<x<2$) is formed.

Next, a positive electrode slurry is prepared by mixing the $ZrO_{2-x}$, as a positive electrode additive, with a positive electrode active material, a conductive agent, and a binder, and a positive electrode active material layer may be prepared by using the positive electrode slurry.

The above-described high-nickel lithium transition metal oxide may be used as the positive electrode active material. The lithium transition metal oxide may be used by purchasing a commercially available product, or may be prepared by using a method of preparing a lithium transition metal oxide which is known in the art. For example, the lithium transition metal oxide may be prepared by mixing a lithium raw material and a positive electrode active material precursor and then sintering the mixture.

Also, a positive electrode slurry composition, which is prepared by dissolving or dispersing the above-described positive electrode active material and positive electrode additive as well as optionally the binder, the conductive agent, and a dispersant in a solvent, if necessary, is coated on the positive electrode collector, and the positive electrode may then be prepared by drying and rolling the coated positive electrode collector, or the positive electrode may be prepared by casting the positive electrode slurry composition on a separate support and then laminating a positive electrode active material layer separated from the support on the positive electrode collector.

The solvent may be a solvent normally used in the art, and may include dimethyl sulfoxide (DMSO), isopropyl alcohol, N-methylpyrrolidone (NMP), dimethyl formamide (DMF), acetone, or water, and any one thereof or a mixture of two or more thereof may be used. An amount of the solvent used may be sufficient if the solvent may dissolve or disperse the positive electrode active material, the conductive agent, the binder, and the dispersant in consideration of a coating thickness of a slurry and manufacturing yield, and may allow to have a viscosity that may provide excellent thickness uniformity during the subsequent coating for the preparation of the positive electrode.

Electrochemical Device

Next, an electrochemical device according to the present invention will be described. The electrochemical device according to the present invention includes the above-described positive electrode of the present invention, wherein the electrochemical device may specifically be a battery or a capacitor, and may more specifically be a lithium secondary battery.

The lithium secondary battery specifically includes a positive electrode, a negative electrode disposed to face the positive electrode, a separator disposed between the positive electrode and the negative electrode, and an electrolyte. Also, the lithium secondary battery may further optionally include a battery container accommodating an electrode assembly of the positive electrode, the negative electrode, and the separator, and a sealing member sealing the battery container.

Since the positive electrode is the same as described above, detailed descriptions thereof will be omitted, and the remaining configurations will be only described in detail below.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve adhesion of a negative electrode active material. The negative electrode collector, for example, may be used in various shapes such as that of a film, a sheet, a foil, a net, a porous body, a foam body, a non-woven fabric body, and the like.

The negative electrode active material layer optionally includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; fluorocarbon; metal powder such as aluminum powder and nickel powder; conductive whiskers such as zinc oxide whiskers and potassium titanate whiskers; conductive metal oxide such as titanium oxide; or polyphenylene derivatives, may be used.

The negative electrode, for example, may be prepared by coating a negative electrode material mixture slurry, which is prepared by dissolving or dispersing optionally the binder and the conductive agent as well as the negative electrode active material in a solvent, on the negative electrode collector and drying the coated negative electrode collector, or may be prepared by casting the negative electrode material mixture slurry on a separate support and then laminating a film separated from the support on the negative electrode collector. Also, a graphite electrode formed of carbon (C) or a metal itself may be used as the negative electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent is preferable, and a mixture of a cyclic carbonate (e.g., ethylene carbonate or propylene having carbonate) high ionic conductivity and high dielectric constant, which may increase charge/discharge performance of the battery, and a low-viscosity linear carbonate-based compound (e.g., ethylmethyl carbonate, dimethyl carbonate, or diethyl carbonate) is more preferable.

The lithium salt may be used without particular limitation as long as it is a compound capable of providing lithium ions used in the lithium secondary battery. Specifically, an anion of the lithium salt may be at least one selected from the group consisting of $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$, and $LiPF_6$, $LiClO_4$, $LiAsF_6$, $LiBF_4$, $LiSbF_6$, $LiAlO_4$, $LiAlCl_4$, $LiCF_3SO_3$, $LiCAF_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. If the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride, may be further included in the electrolyte in addition to the above electrolyte components. In this case, the additive may be included in an amount of 0.1 wt % to 5 wt % based on a total weight of the electrolyte.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Examples of the medium and large sized device may be an electric vehicle, a hybrid electric vehicle, a plug-in hybrid electric vehicle, and a power storage system, but the medium and large sized device is not limited thereto.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

Preparation Example 1

A precursor solution was prepared by using 12 g of a zirconium (Zr) acetate solution, 5 g of acetic acid, 0.6 g of polyvinylpyrrolidone (PVP), and 27 g of dimethylformamide (DMF). The solution was stirred for about 24 hours until it showed a clear color.

$ZrO_{2-x}$ (0<x<2) was obtained in the form of black powder by reducing the precursor solution containing zirconium acetate by performing a heat treatment at 600° C. in a hydrogen and argon gas atmosphere. Herein, the hydrogen and argon gas atmosphere is one in which a mixed gas having a composition of 5 vol % of hydrogen and 95 vol % of argon was injected at a flow rate of 15 cc/min for 4 hours.

Preparation Example 2

$ZrO_2$ was obtained in the form of white powder by processing as in Preparation Example 1 except that the precursor solution containing zirconium acetate was heat-treated at 800° C. in an air atmosphere.

<Average Particle Diameter Measurement>

An average particle diameter ($D_{50}$) of the prepared $ZrO_{2-x}$ (0<x<2) was measured using a SEM. As a result of the measurement, the average particle diameter ($D_{50}$) was in a range of 0.20 μm to 50 μm.

<XRD Measurement>

FIG. 1(*a*) is a result of observing an XRD pattern for $ZrO_{2-x}$ (0<x<2) particles of Preparation Example 1 using an X-ray diffraction analyzer. For comparison, an XRD pattern was also observed for $ZrO_2$ particles of Preparation Example 2, and the results thereof are illustrated in FIG. 1(*b*).

Referring to FIG. 1, the $ZrO_{2-x}$ (0<x<2) particles subjected to the heat treatment in a reducing atmosphere had a tetragonal crystal structure and showed 2θ peaks at 30.7°, 35.5°, 51.0°, 60.3°, and 63.4°.

In contrast, the $ZrO_2$ particles subjected to the heat treatment in an air atmosphere had a monoclinic crystal structure and showed 2θ peaks at 24.3°, 28.4°, 31.7°, 34.4°, 38.9°, 41.0°, 45.0°, 45.9°, 49.6°, 50.4°, 54.3°, 55.8°, 57.5°, 58.3°, 61.6°, 62.3°, 64.5°, 66.0°, and 69.2°.

Peak intensities of the 2θ peaks are presented in Tables 1 and 2 below.

TABLE 1

| Tetragonal structured $ZrO_{2-x}$ | | | | | |
|---|---|---|---|---|---|
| 2 Theta | 30.7 | 35.5 | 51.0 | 60.6 | 63.7 |
| Intensity | 3939 | 745 | 1849 | 1143 | 163 |

TABLE 2

| Monoclinic structured $Zro_2$ | | | | | | | | | | |
|---|---|---|---|---|---|---|---|---|---|---|
| 2 Theta | 24.3 | 28.4 | 31.7 | 34.4 | 38.9 | 41.0 | 45.1 | 45.9 | 49.6 | 54.3 |
| Intensity | 402 | 3532 | 3351.5 | 1390 | 433 | 1027 | 554 | 499 | 1885 | 995 |
| 2 Theta | 55.7 | 57.5 | 58.3 | 61.6 | 62.3 | 64.5 | 66.0 | 69.2 | | |
| Intensity | 1370 | 545 | 481 | 491 | 543 | 224 | 831 | 189 | | |

<Band Gap Energy Measurement>

Reflectance was measured for $ZrO_{2-x}$ (0<x<2) particles and $ZrO_2$ particles in a wavelength range of 200 nm to 800 nm using an ultraviolet, visible, and near-infrared spectrometer (UV-Visible-NIR spectrometer), and band gap energy for each material was calculated by tangent of Tauc plot.

As a result, it may be confirmed that the $ZrO_{2-x}$ (0<x<2) particles had a band gap energy of 2.52 eV and the $ZrO_2$ particles had a band gap energy of 5.0 eV.

In this case, a band gap means an energy difference between the highest energy level (conduction band), in which electrons exist, and the lowest energy level (valence band) in which electrons do not exist, wherein the lower the band gap is, the easier the excitation of electrons is to increase conductivity, and, in contrast, the higher the band gap is, the more difficult the excitation of the electrons is to decrease the conductivity.

That is, it may be confirmed that the $ZrO_{2-x}$ (0<x<2) particles exhibited higher conductivity than the $ZrO_2$ particles.

For reference, it may be confirmed that the $ZrO_2$ particles of Preparation Example 2 had a white color, but the $ZrO_{2-x}$ (0<x<2) particles of Preparation Example 1 had a black color. That is, the $ZrO_{2-x}$ (0<x<2) particles according to an embodiment of the present invention may have high absorbance of visible light.

Example 1

82 wt % of $LiNi_{0.8}Co_{0.1}Mn_{0.1}O_2$ as a positive electrode active material, 8 wt % of carbon black Super P as a conductive agent, 7 wt % of polyvinylidene pyrrolidone (PVDF) as a binder, and 3 wt % of $ZrO_{2-x}$ (0<x<2) of Preparation Example 1, as a positive electrode additive, were mixed in an N-methylpyrrolidone (NMP) solvent to prepare a positive electrode slurry (solid content 51.8%). One surface of an aluminum current collector was coated with the positive electrode slurry, dried at 110° C. for 12 hours in vacuum, and then rolled to prepare a positive electrode.

Li metal was used as a counter electrode of the positive electrode, and an electrode assembly was prepared by disposing a polypropylene separator between the positive electrode and negative electrode.

$LiPF_6$, a lithium salt, was included at a concentration of 1 M in an organic solvent in which ethylene carbonate (EC):diethyl carbonate (DEC) were mixed in a volume ratio of 1:1, and fluoroethylene carbonate (FEC), as an additive, was added such that it was included at a concentration of 5 wt % to prepare an electrolyte solution.

The electrode assembly was disposed in a case and the above-prepared electrolyte solution was injected to prepare a secondary battery.

Comparative Example 1

A secondary battery was prepared in the same manner as in Example 1 except that 82 wt % of $LiNi_{0.8}Co_{0.1}Mn_{0.1}O_2$ as a positive electrode active material, 8 wt % of carbon black Super P as a conductive agent, and 7 wt % of polyvinylidene pyrrolidone (PVDF), as a binder, were mixed in an NMP solvent to prepare a positive electrode slurry (solid content 51.8%) and a positive electrode additive was not used.

Comparative Example 2

A secondary battery was prepared in the same manner as in Example 1 except that $ZrO_2$ prepared in Preparation Example 2, instead of $ZrO_{2-x}$ ($0<x<2$), was used as a positive electrode additive.

<XRD Measurement of the Positive Electrodes of Example 1 and Comparative Examples 1 and 2>

Figure 2:
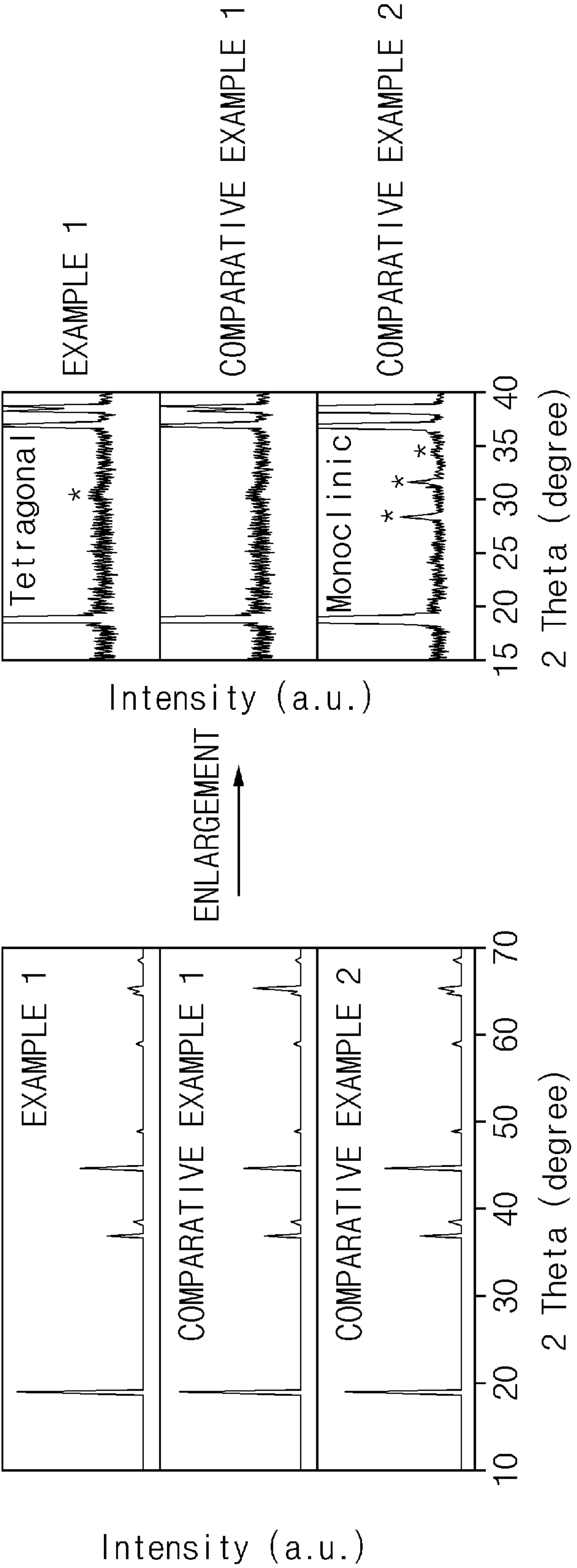
FIG. 2 is a result of observing XRD patterns for positive electrodes prepared in Example 1 and Comparative Examples 1 and 2 using an X-ray diffraction analyzer.

FIG. 2 is a result of observing XRD patterns for the positive electrodes prepared in Example 1 and Comparative Examples 1 and 2 using an X-ray diffraction analyzer. In FIG. 2, since peaks corresponding to each of the tetragonal and monoclinic structures of the additives were still observed after mixing with the positive electrode active material, it may be confirmed that the structure of each additive was maintained even after mixing with the positive electrode active material.

Experimental Example 1—Cycle Characteristics Evaluation

Charging of each of the secondary batteries prepared in Example 1 and Comparative Examples 1 and 2 at a constant current of 0.1 C to 4.3 V at 25° C. and discharging of each secondary battery at a constant current of 0.1 C to 2.5 V were set as one cycle, and, after 50 cycles of charging and discharging were performed, a capacity retention relative to initial capacity after 50 cycles was measured. The results thereof are presented in Table 3 below.

TABLE 3

| | Initial capacity (mAh $g^{-1}$) | Capacity after 50 cycles (mAh $g^{-1}$) | Capacity retention (%) |
|---|---|---|---|
| Example 1 | 203 | 165 | 81 |
| Comparative Example 1 | 208 | 144 | 68 |
| Comparative Example 2 | 202 | 131 | 64 |

The secondary battery of Example 1 using $ZrO_{2-x}$ ($0<x<2$) as a positive electrode additive had better cycle characteristics than Comparative Example 1 in which the positive electrode additive was not used. This is considered to be because, in a case in which $ZrO_{2-x}$ ($0<x<2$) was used as a positive electrode additive, the surface of the positive electrode active material was stabilized and $ZrO_{2-x}$ ($0<x<2$) collected oxygen gas generated at high voltage. Also, the secondary battery of Example 1 using $ZrO_{2-x}$ ($0<x<2$) as a positive electrode additive had better cycle characteristics than the secondary battery of Comparative Example 2 using $ZrO_2$ as a positive electrode additive. This is considered to be because $ZrO_{2-x}$ ($0<x<2$) had $Zr^{3+}$ and its bandgap energy was decreased to have high electron conductivity in comparison to $ZrO_2$.

Experimental Example 2—Cycle Characteristics Evaluation During High-rate Charge

Charging of each of the lithium secondary batteries prepared in Example 1 and Comparative Examples 1 and 2 at 0.1 C rate to 4.3 V under a constant current condition at 25° C. and discharging of each lithium secondary battery at 0.8 C rate to 2.5 V were set as one cycle, and, after 50 cycles of charging and discharging were performed, a capacity retention relative to initial capacity was calculated by measuring capacity after 50 cycles. The results thereof are presented in Table 4 below.

TABLE 4

| | Initial capacity (mAh $g^{-1}$) | Capacity after 50 cycles (mAh $g^{-1}$) | Capacity retention (%) |
|---|---|---|---|
| Example 1 | 173 | 125 | 72.2 |
| Comparative Example 1 | 177 | 122 | 68.9 |
| Comparative Example 2 | 172 | 88 | 51.1 |

The secondary battery of Example 1 using $ZrO_{2-x}$ ($0<x<2$) as a positive electrode additive had better cycle characteristics than Comparative Example 1, in which the positive electrode additive was not used, even when it was charged and discharged at a high rate. This is considered to be because, in the case that $ZrO_{2-x}$ ($0<x<2$) was used as a positive electrode additive, the surface of the positive electrode active material was stabilized and $ZrO_{2-x}$ ($0<x<2$) collected oxygen gas generated at high voltage. Also, the secondary battery of Example 1 using $ZrO_{2-x}$ ($0<x<2$) as a positive electrode additive had better cycle characteristics than the secondary battery of Comparative Example 2 using $ZrO_2$ as a positive electrode additive even when it was charged and discharged at a high rate. This is considered to be because $ZrO_{2-x}$ ($0<x<2$) had $Zr^{3+}$ and its bandgap energy was decreased to have high electron conductivity in comparison to $ZrO_2$.

Experimental Example 3—Gas Generation Amount Evaluation

Each of the secondary batteries prepared in Example 1 and Comparative Example 1 was charged at 0.1 C rate to 4.5

V under a constant current condition, and amounts of $CO_2$, CO, and $O_2$ generated were measured using differential electrochemical mass spectrometry (DEMS) at 25° C. The results thereof are shown in FIG. 3.

Figure 3:
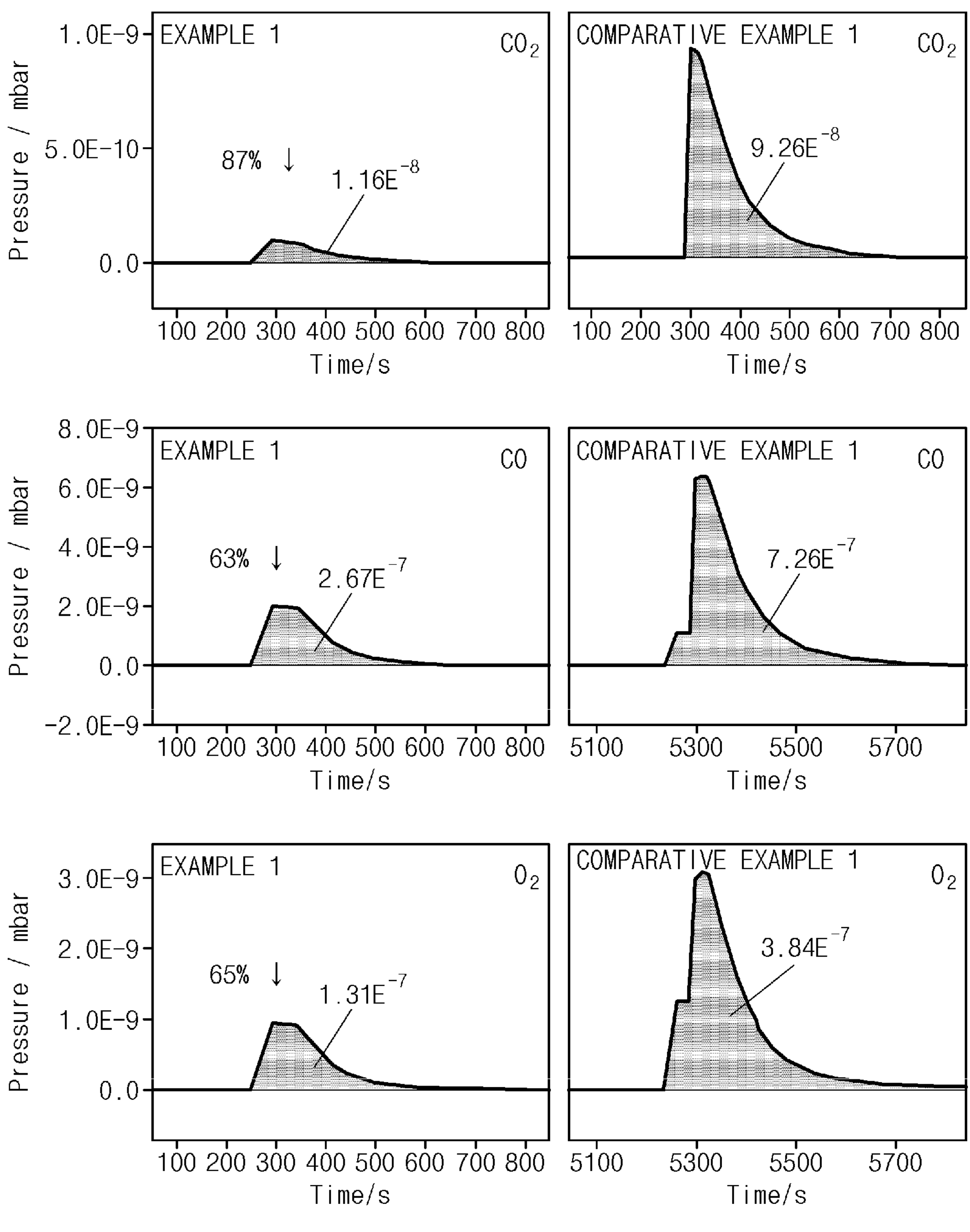
FIG. 3 is a result of measuring amounts of $CO_2$, CO, and $O_2$ generated in each of the secondary batteries prepared in Example 1 and Comparative Example 1 using Differential Electrochemical Mass Spectrometry (DEMS).

Referring to the results of FIG. 3, it may be confirmed that the amounts of the gases generated in Example 1 were all significantly reduced in comparison to those of Comparative Example 1 in which the positive electrode additive was not used. This is considered to be because, in the case that $ZrO_{2-x}$ ($0<x<2$) was used as a positive electrode additive, the surface of the positive electrode active material was stabilized and $ZrO_{2-x}$ ($0<x<2$) collected oxygen gas generated at high voltage.

The invention claimed is:

1. A positive electrode comprising:

a positive electrode active material layer including a positive electrode active material, a conductive agent, a binder, and a positive electrode additive, wherein the positive electrode additive is $ZrO_{2-x}$, wherein $0<x<2$.

2. The positive electrode of claim 1, wherein the positive electrode active material comprises a lithium transition metal oxide represented by Formula 1:

$$Li_aNi_{1-x-y}Co_xM^1_yM^2_zO_2 \quad \text{[Formula 1]}$$

wherein, in Formula 1, $M^1$ is aluminum (Al), manganese (Mn), or a combination thereof, $M^2$ is at least one element selected from the group consisting of zirconium (Zr), titanium (Ti), magnesium (Mg), tantalum (Ta), niobium (Nb), tungsten (W), molybdenum (Mo), and chromium (Cr), and $1.0 \le a \le 1.3$, $0<x<0.4$, $0<y<0.4$, $0 \le z \le 0.1$, and $0.6 \le 1-x-y<1.0$.

3. The positive electrode of claim 1, wherein the positive electrode additive has an average particle diameter ($D_{50}$) of 200 nm to 50 μm.

4. The positive electrode of claim 1, wherein the $ZrO_{2-x}$ satisfies Equation 1:

$$5<P1/P2<8 \quad \text{[Equation 1]}$$

wherein, in Equation 1,

P1 is an intensity of a peak in a 2θ range of 29° or more to 31° or less on XRD, and P2 is an intensity of a peak in a 2θ range of 35° or more to 37° or less on XRD.

5. The positive electrode of claim 1, wherein the positive electrode additive has a tetragonal crystal structure.

6. The positive electrode of claim 1, wherein the positive electrode additive has a band gap energy of 3.0 eV or less.

7. The positive electrode of claim 1, wherein the positive electrode additive is included in an amount of 1 wt % to 5 wt % based on a total weight of the positive electrode active material layer.

8. A lithium secondary battery comprising the positive electrode of claim 1.

9. A method of preparing a positive electrode, the method comprising:

preparing $ZrO_{2-x}$ ($0<x<2$) by reducing a precursor containing zirconium (Zr);

preparing a positive electrode slurry by mixing the $ZrO_{2-x}$, as a positive electrode additive, with a positive electrode active material, a conductive agent, and a binder; and preparing a positive electrode active material layer by using the positive electrode slurry.

10. The method of claim 9, wherein the precursor is at least one selected from acetate, sulfate, and nitrate of Zr.

11. The method of claim 9, wherein the $ZrO_{2-x}$ ($0<x<2$) is prepared by performing a heat treatment on a precursor solution containing zirconium in a reducing atmosphere.

12. The method of claim 11, wherein the reducing atmosphere is formed by hydrogen and argon.

13. The method of claim 11, wherein the heat treatment is performed at a temperature of 500° C. to 700° C.

* * * * *